(12) United States Patent
Kim

(10) Patent No.: US 6,246,768 B1
(45) Date of Patent: Jun. 12, 2001

(54) DATA ENCRYPTION SYSTEM FOR ENCRYPTING PLAINTEXT DATA

(75) Inventor: Yong-Duk Kim, Seoul (KR)

(73) Assignee: Penta Security Systems, Inc., Seoul (KR)

( * ) Notice: Subject to any disclaimer, the term of this patent is extended or adjusted under 35 U.S.C. 154(b) by 0 days.

(21) Appl. No.: 09/114,043

(22) Filed: Jul. 13, 1998

(30) Foreign Application Priority Data

May 6, 1998 (KR) ................................................ 98-16147

(51) Int. Cl.[7] ...................................................... H04L 9/00
(52) U.S. Cl. ................................ 380/28; 380/42; 380/29; 380/277; 380/255; 380/259
(58) Field of Search .................... 380/255, 259, 380/42, 277, 28, 29

(56) References Cited

U.S. PATENT DOCUMENTS

| | | | |
|---|---|---|---|
| 4,322,577 | * | 3/1982 | Brandstrom ........................ 178/22.05 |
| 4,797,921 | * | 1/1989 | Shiraishi ................................. 380/28 |
| 4,850,019 | * | 7/1989 | Shimizu et al. ........................ 380/29 |
| 5,003,597 | * | 3/1991 | Merkle .................................... 380/37 |
| 5,120,939 | * | 6/1992 | Claus et al. .......................... 235/382 |
| 5,317,639 | * | 5/1994 | Mittenthal .............................. 380/37 |
| 5,398,284 | * | 3/1995 | Koopman, Jr. et al. ............... 380/28 |
| 5,511,123 | * | 4/1996 | Adams .................................... 380/29 |
| 5,745,577 | * | 4/1998 | Leech ..................................... 380/28 |
| 5,825,886 | * | 10/1998 | Adams et al. .......................... 380/28 |
| 5,949,884 | * | 9/1999 | Adams et al. .......................... 380/29 |
| 6,031,911 | * | 2/2000 | Adams et al. .......................... 380/29 |
| 6,078,665 | * | 6/2000 | Anderson et al. ...................... 380/28 |

OTHER PUBLICATIONS

Applied Cryptography—Second Edition (Bruce Schneier, 1996, pp. 270–271, 334–338).*
Specification of E2—a 128–bit Block Cipher (Nippon Telegraph & Telephone Corp., Jun. 14, 1998, http://info.isl.ntt.co.jp/e2).*
Twofish: A 128–Bit Block Cipher (Schneier et al., Jun. 15, 1998, http://www.counterpane.com/twofish.html).*
AES Proposal: Rijndael (Joan Daemen & Vincent Rijmen, Mar. 9, 1999, http://www.esat.kuleuven.ac.be/~rijmen/rijndael).*

* cited by examiner

Primary Examiner—Tod Swann
Assistant Examiner—Paul E. Callahan
(74) Attorney, Agent, or Firm—Bacon & Thomas, PLLC

(57) ABSTRACT

In order to encrypt plaintext data while maintaining high security, the plaintext data is received and divided into a plurality of plaintext data blocks, each of which has the same bit length. A preset master key is used to obtain a set of round subkeys, and each of the plaintext data blocks is encrypted by using the preset master key and combining the encrypted blocks to thereby provide cipheitext data having a bit length which is identical to that of the plaintext data.

4 Claims, 3 Drawing Sheets

DATA ENCRYPTION SYSTEM FOR ENCRYPTING PLAINTEXT DATA

FIELD OF THE INVENTION

The present invention relates to a data encryption system; and, more particularly, to a data encryption system capable of maintaining a high security while effectively encrypting plaintext data.

BACKGROUND OF THE INVENTION

One of the widely used data encryption algorithms is the one based on the data encryption standard (DES) adopted by the National Bureau of Standards (NBS). The DES is used for carrying out block encryption using a 56-bit secret key. According to the DES, each of plaintext blocks has a length of 64 bits; and its ciphertext block also has the same bit length as that of each plaintext block. Transmission of the ciphertext blocks is effected via a public network.

Since, however, the DES employs the smaller number of bits in a secret key to encrypt the 64-bit blocks, it may not be able to provide a data encryption scheme with a high security. Further, since the secret key is not uniformly assigned to all of the 64-bit blocks, it is relatively easy to decrypt a ciphertext block encrypted by employing the conventional cryptanalysis techniques such as the differential cryptanalysis (DC) or the linear cryptanalysis (LC).

To ameliorate the problems inherent in the DES and develop a more powerful encryption scheme, various candidate algorithms have been proposed to establish the advanced encryption standard (AES) emerged from the National Institute of Standards and Technology (NIST). Among the candidate algorithms, an optimum algorithm will be adopted as the AES in the near future. However, hitherto, there are no known devices and methods implemented on the basis of the algorithms or the proposal requirements of the NIST.

SUMMARY OF THE INVENTION

It is, therefore, a primary object of the present invention to provide a data encryption system capable of maintaining a high security while effectively encrypting input plaintext data.

In accordance with one aspect of the invention, there is provided a data encryption system for encrypting plaintext data, which comprises: means for receiving and dividing the plaintext data into a plurality of data blocks, each of the data blocks has a same bit length; means for scheduling a preset master key to obtain a set of round subkeys, the preset master key having the same bit length as that of the plaintext data; means for encrypting each of the data blocks by using a corresponding round subkey among the set of round subkeys and combining the encrypted blocks to thereby provide ciphertext data having the same bit length as that of the plaintext data.

The encryption means includes means for dividing each of the data blocks into a plurality of data subblocks, each of the subblocks having a same bit length; means for adding each of the subblocks to a corresponding round subkey among the set of round subkeys to generate a key added data subblock corresponding to said each subblock; means for dividing each of the key added data subblocks into a pair of key added subblocks, each of the pair of key added subblocks having a same bit length; means for obtaining a key/data added data subblock for each of the pair of data subblocks by using a round subkey corresponding to said each data subblock; and means for processing each of the key/data added data subblocks to provide the ciphertext data.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
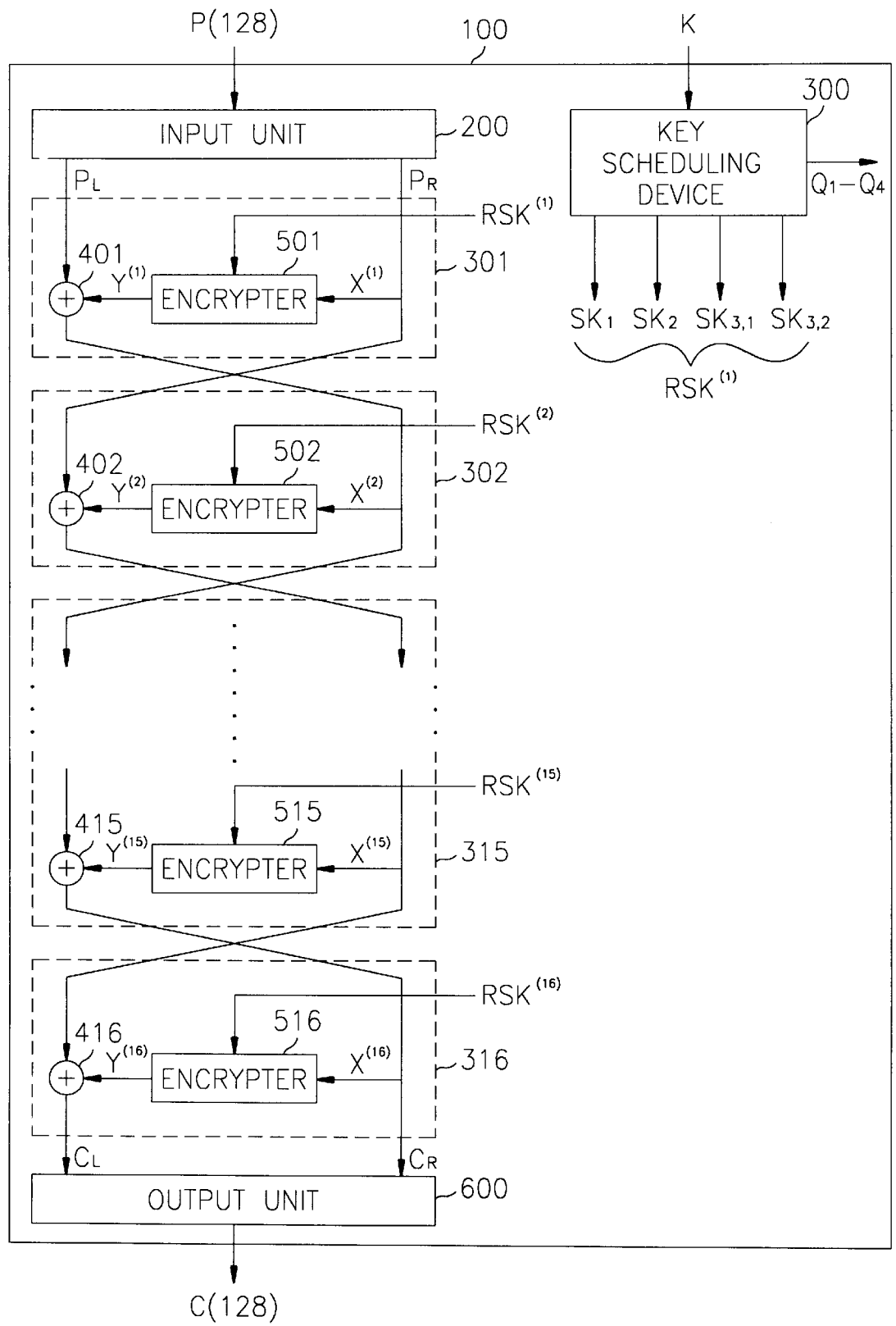
FIG. 1 shows a block diagram of a data encryption system in accordance with the present invention.

Referring to FIG. 1, there is shown a block diagram of a data encryption system 100 for encrypting input plaintext data in accordance with the present invention. As will be described below, the inventive data encryption system effectively encrypts the input plaintext data by using a preset master key to provide ciphertext data. The data encryption system 100 of the invention comprises an input and an output units 200 and 600, a key scheduling device 300 and a plurality of, e.g., 16, data encryption stages 301–316. For the sake of simplicity, only four data encryption stages, 301, 302, 315 and 316, are illustratively shown in FIG. 1.

Specifically, input plaintext data P(128) of, e.g., 128 bits, is first supplied from a message source, e.g., a first computer (not shown), to the input unit 200. At the input unit 200, the input plaintext data of 128 bits is preferably equally divided into N, e.g., 2, data blocks, $P_L$ and $P_R$, each of which has a same bit length of, e.g., 64 bits. The former data block $P_L$ of 64 bits is applied to an exclusive-OR (EX-OR) gate 401 included in the first encryption stage 301, while the latter data block $P_R$ of 64 bits is delivered as $X^{(1)}$ to an encrypter 501 in the first stage 301 and to an EX-OR gate 402 in the second data encryption stage 302. As shown in FIG. 1, each of the sixteen data encryption stages 301–316 includes an EX-OR gate and an encrypter, e.g., the first data encryption stage 301 includes the EX-OR gate 401 and the encrypter 501. Details of the encrypter 501 will be provided with reference to FIG. 2 hereinafter.

At the key scheduling device 300, sixteen sets of round subkeys, to be used in encrypting the input plaintext data in each of sixteen rounds, are derived by using the preset master key K of 128 bits the bit length of which is identical to that of the input plaintext data. For the sake of simplicity, hereinafter, only a series of processes to derive the first set of round subkeys, $SK_1$, $SK_2$, $SK_{3,1}$ and $SK_{3,2}$ to be used in the first round are provided in detail. The first set of round subkeys, as shown in FIG. 1, are fed to the encrypter 501 as $RSK^{(i)}$. Also four constant values, $Q_1$–$Q_4$, whose values depend on the preset master key at the key scheduling device 300 are obtained.

Figure 3:
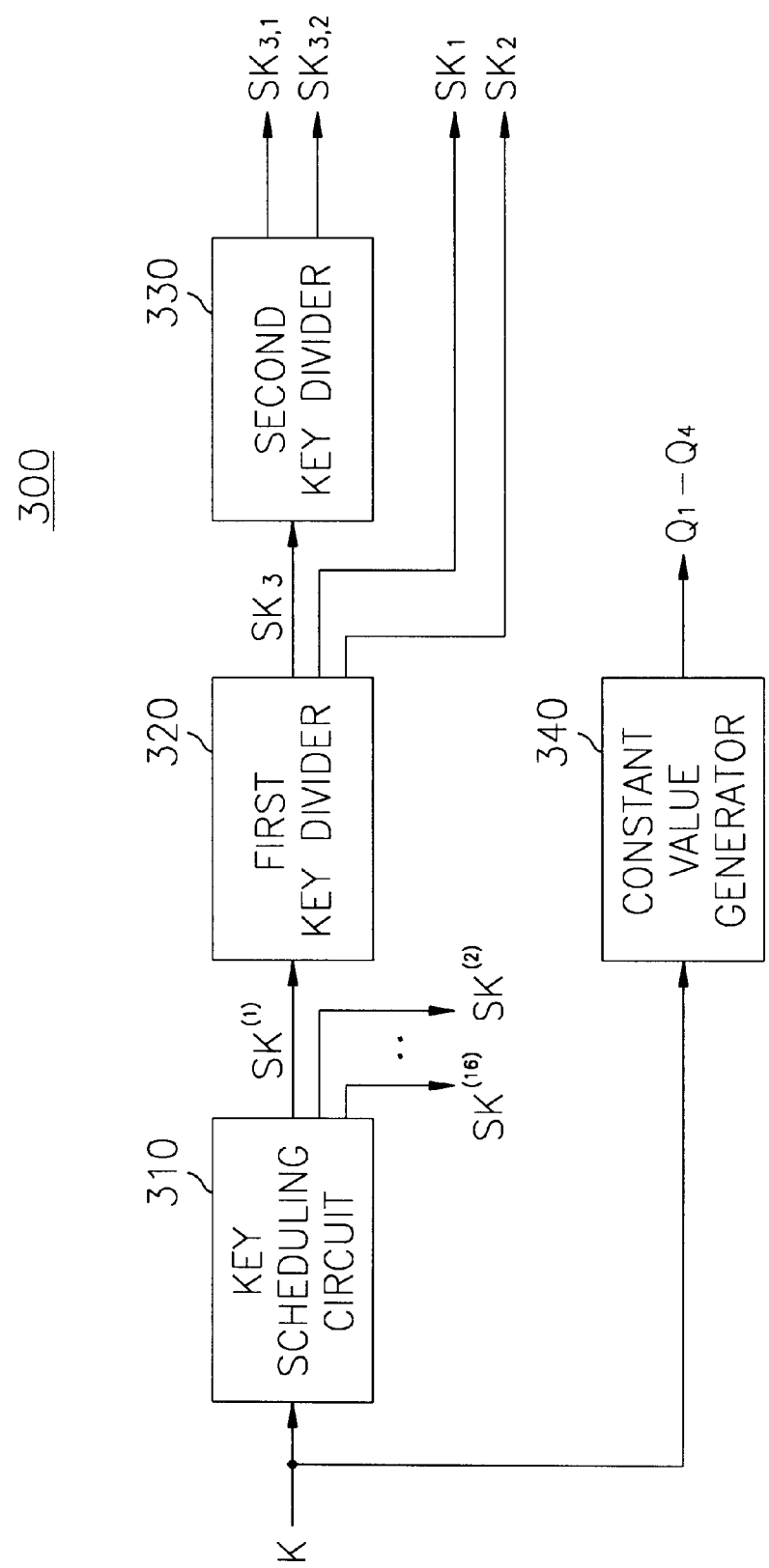
FIG. 3 offers a detailed block diagram of a key scheduling device shown in FIG. 1.

Referring to FIG. 3, there is provided a detailed block diagram of the key scheduling device 300 shown in FIG. 1, wherein the device 300 includes a key scheduling circuit 310, a first and a second key dividers 320 and 330, and a constant value generator 340. At the key scheduling circuit 310, the preset master key K of 128 bits is received first; and a plurality of, e.g., 16, round keys, $SK^{(1)}$–$SK^{(16)}$, are obtained by combining the preset master key of 128 bits, each of the round keys having a same bit length of, e.g., 96 bits. It should be noted that not only avalanche effect can be maximized but one-wayness is satisfied since it is designed that the preset master key of 128 bits is uniformly assigned to all of the sixteen rounds to obtain the sixteen round keys. The one-wayness characteristic prevents the original preset master key from being reconstructed by using some of the sixteen round keys, and also prevents the remaining round keys also from being be reconstructed by using said some of the sixteen round keys.

Each of the sixteen round keys $SK^{(1)}$–$SK^{(16)}$ is supplied to a corresponding key divider. In FIG. 3, for the sake of simplicity, there is illustratively shown a block drawing to generate only the first set of round subkeys, $SK_1$, $SK_2$, $SK_{3,1}$ and $SK_{3,2}$, by using the first round key $SK^{(1)}$ at the key scheduling circuit 310. The first round key $SK^{(1)}$ of 96 bits is applied to the first key divider 320, wherein $SK^{(1)}$ of 96 bits is divided into three round subkeys, $SK_1$–$SK_3$, each of the round subkeys having a same bit length of 32 bits.

Thereafter, the first and the second round subkeys $SK_1$ and $SK_2$ are delivered to the encrypter 501, shown in the FIG. 1 whereas the third round subkey $SK_3$ is fed to the second key divider 330 for further division. At the second key divider 330, the third round subkey $SK_3$ is further divided into two round subkeys, $SK_{3,1}$ and $SK_{3,2}$, each having a same bit length of 16 bits. The first set of round subkeys, $SK_1$, $SK_2$, $SK_{3,1}$ and $SK_{3,2}$, are then provided to the encrypter 501 as $SK^{(1)}$ as shown in FIG. 1.

Using the first set of round subkeys, $SK_1$, $SK_2$, $SK_{3,1}$, $SK_{3,2}$, provided from the key scheduling device 300, the encrypter 501 encrypts the data block $X^{(1)}$ applied thereto, to thereby output an encrypted data block $Y^{(1)}$ of 64 bits. A detailed description of the encrypter 501 will be given with reference to FIG. 2 hereinafter.

Figure 2:
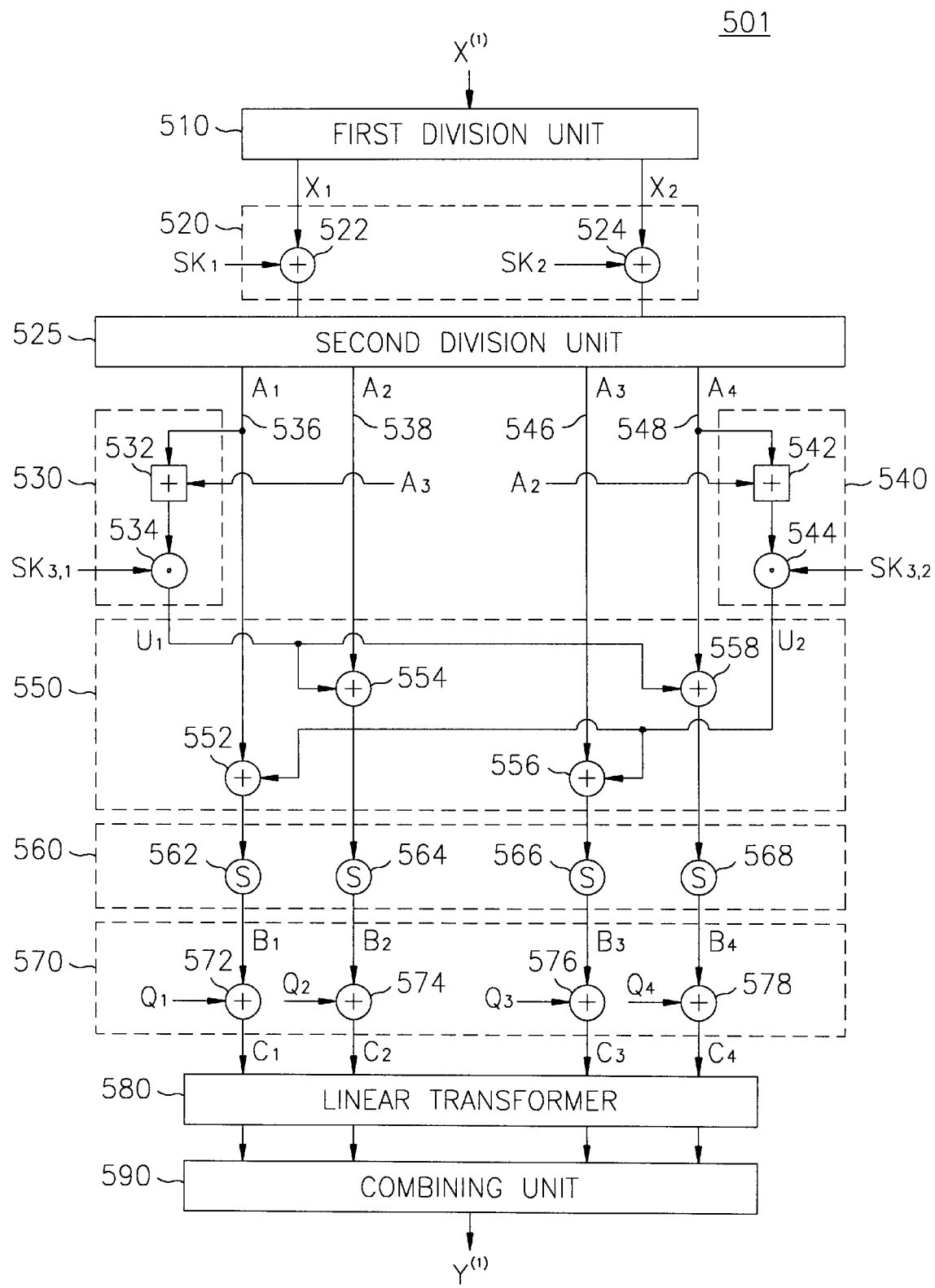
FIG. 2 provides a detailed block diagram of an encrypter of a first data encryption device shown in FIG. 1.

Turning now to FIG. 2, there is depicted a detailed block diagram of the encrypter 501 shown in FIG. 1 in accordance with the invention. The encrypter 501 has a first and a second division units 510 and 525, three key adding circuits 520, 530 and 540, a data adding circuit 550, a substitution (S) box 560, a constant value adding circuit 570, a linear transformer 580 and a combining unit 590.

At the first division unit 510, the data block $X^{(1)}$ of 64-bits from the input unit 200 shown in FIG. 1 is divided into two data subblocks, $X_1$ and $X_2$, each of which has a same bit length of 32 bits. Each of the two data subblocks is then coupled to a corresponding one of two EX-OR gates 522 and 524 contained in the first key adding circuit 520. As shown in FIG. 2, inputs to the first EX-OR gate 522 are the former data subblock $X_1$ and the first subkey $SK_1$ of 32 bits from the first key divider 320 shown in FIG. 3. The first EX-OR gate 522, as is well known in the art, performs a bitwise EX-OR operation on the two inputs applied thereto; and then the EX-OR operated output is delivered to the second division unit 525 as a first key added data subblock. Similarly, the second EX-OR gate 524 accepts the latter data subblock $X_2$ from the first division unit 510 and the second subkey $SK_2$ from the first key divider 320 show in FIG. 3 and also carries out a bitwise EX-OR operation on the above two inputs thereto. The EX-OR operated output from the second EX-OR gate 524 is provided as a second key added data subblock to the second division unit 525.

At the second division unit 525, each of the first and the second key added data subblocks is further divided into two data subblocks. To be more specific, the first key added data subblock is divided into two data subblocks, $A_1$ and $A_2$, and the second key added data subblock is divided into two data subblocks, $A_3$ and $A_4$, each of the four data subblocks having a same bit length of 16 bits. As shown in FIG. 2, the first data subblock $A_1$ is coupled to the second key adding circuit 530 and the data adding circuit 550; and the second data subblock $A_2$ is coupled to the third key adding circuit 540 and the data adding circuit 550. And, the third data subblock $A_3$ is coupled to the second key adding circuit 530 and the data adding circuit 550; and the fourth data subblock $A_4$ is coupled to the third key adding circuit 540 and the data adding circuit 550.

At the second key adding circuit 530 containing an addition modulo $2^{16}$ unit 532 and a multiplication modulo $2^{16}+1$ unit 534, a key/data added data subblock $U_1$ for the first data subblock $A_1$ is obtained by using the third data subblock $A_3$ and the round subkey $SK_{3,1}$ from the second key divider 330 shown in FIG. 3. It should be noted that the number of the addition modulo 2 units is decided based on the division number of each of the first and the second key added data subblocks from the second division unit 525.

Specifically, the addition modulo $2^{16}$ unit 532 performs an addition modulo $2^{16}$ operation on inputs coupled thereto, i.e., the first and the third data subblocks $A_1$ and $A_3$ from the second division unit 525. The multiplication modulo $2^{16}+1$ unit 534 carries out a multiplication modulo $2^{16}+1$ operation on inputs coupled thereto, i.e., the output from the addition modulo $2^{16}$ unit 532 and the round subkey $SK_{3,1}$ from the second key divider 330 shown in FIG. 3, thereby obtaining the first key/data added data subblock $U_1$ for the first data subblock $A_1$. Details of the addition modulo $2^{16}$ operation and the multiplication modulo $2^{16}+1$ operation are omitted here for the sake of simplicity since they are well known in the art.

Meanwhile, the third key adding circuit 540, which contains an addition modulo $2^{16}$ unit 542 and a multiplication modulo $2^{16}+1$ unit 544, is substantially identical to the second key adding circuit 530 except that inputs thereto are different from each other. Therefore, details of the third key adding circuit 540 are omitted here for the sake of simplicity. Accordingly, an output from the third key adding circuit 540 will be a second key/data added data subblock $U_2$ for the fourth data subblock $A_4$. The first key/data added data subblock $U_1$ is coupled to EX-OR gates 554 and 558 in the data adding circuit 550, while the second key/data added data subblock $U_2$ is coupled to EX-OR gates 552 and 556.

In accordance with the present invention, since the data subblocks from the second division unit 525 affect the first and the second key/data added data subblocks by performing the addition modulo $2^{16}$ operation, it is possible to derive a diffusion effect and an avalanche effect as can be inferred from the above. Further, by carrying out the nonlinear multiplication modulo $2^{16}+1$ operation on the output from the addition modulo $2^{16}$ unit and the corresponding round subkey, it is very difficult to decrypt ciphertext data by using conventional cryptanalysis techniques, e.g., a differential cryptanalysis (DC) and a linear cryptanalysis (LC).

As shown in FIG. 2, the data adding circuit 550 contains four EX-OR gates 552, 554, 556 and 558. Inputs to the first EX-OR gate 552 are the first data subblock $A_1$ from the second division unit 525 and the second key/data added data subblock $U_2$ from the third data/key adding circuit 540; and inputs to the second EX-OR gate 554 are the second data subblock $A_2$ from the second division unit 525 and the first key/data added data subblock $U_1$ from the second key/data adding circuit 530. Further, inputs to the third EX-OR gate 556 are the third data subblock $A_3$ and the second key/data added data subblock $U_2$; and inputs to the fourth EX-OR gate 558 are the fourth data subblock $A_4$ and the first key/data added data subblock $U_1$. Each of the four EX-OR gates performs a bitwise EX-OR operation on the inputs coupled thereto to provide an EX-OR operated data block. Each of the four EX-OR operated data blocks from the four EX-OR gates is coupled to a corresponding S-box among four 16×16 bit S-boxes 562, 564, 566 and 568 contained in the S-box unit 560.

Each of the four S-boxes, known to be as a substitution box in the art, is provided with an S-box table having a set of predetermined inverse data blocks and chooses one of the set of the inverse data blocks, which corresponds to the input applied thereto. The sets of inverse data blocks are obtained in advance by performing an inverse mapping over GF(Galois Field) ($2^{16}$) and by carrying out an affine transformation which adds a predetermined value to an inverse mapped one to remove a fixed point (e.g., 0 or 1) in the inverse mapped data block which corresponds to any input bit. By performing both the inverse mapping and the affine transformation, it is very difficult to decrypt ciphertext data by using a conventional cryptanalysis technique, e.g., the differential cryptanalysis, thereby improving the security of ciphertext data.

Thereafter, each of the data blocks chosen by the four S-boxes 562, 564, 566 and 568 is then delivered to a corresponding EX-OR gate of four EX-OR gates 572, 574, 576 and 578 in the constant value adding unit 570. Also the four constant values from the constant value generator 340 shown in FIG. 3 are coupled to the respective corresponding EX-OR gates 572, 574, 576 and 578. Each of the four EX-OR gates performs a bitwise EX-OR operation on the inputs coupled thereto and issues four EX-OR operated data blocks, $C_1$–$C_4$, to the linear transformer 580.

The linear transformer 580, which may include a plurality of addition modulo $2^{16}$ units (not shown), performs a linear transformation which carries out an addition modulo $2^{16}$ operation on each of the four EX-OR operated data blocks. For instance, a linear transformed data block on the first EX-OR operated data block $C_1$ is obtained by performing an addition modulo $2^{16}$ operation on the remaining data blocks $C_2$–$C_4$ excepting itself data block $C_1$; and a linear transformed data block on the third EX-OR operated data block $C_3$ is derived by performing an addition modulo $2^{16}$ operation on the remaining data blocks $C_1$, $C_2$ and $C_4$ excepting itself block $C_3$. The linear transformed data blocks are then fed to the combining unit 590 which combines them to output a combined data $y^{(1)}$ of 64 bits. The data so combined, $y^{(1)}$, is applied to the EX-OR gate 401 shown in FIG. 1

Referring back to FIG. 1, the EX-OR gate 401, which receives the first data block $P_L$ from the input unit 200 and the combined data $y^{(1)}$ from the combining unit 590 shown in FIG. 2, performs a bitwise EX-OR operation on them and provides the EX-OR operated data block to an encrypter 502 in the second data encryption stage 302 as $X^{(2)}$. As is described above, the rest of the sixteen data encryption stages 302–316 include the same components as in the first data encryption stage 301; and, therefore, details thereof are omitted here for the sake of simplicity. Outputs of the last data encryption stage 316, i.e., $C_L$ and $C_R$, are delivered to the output unit 600, wherein the outputs are converted in such a manner that it can be transferred, as ciphertext data C(128), to a destination, e.g., a second computer (not shown) via a transmission line.

While the present invention has been shown and described with respect to the particular embodiment, it will be apparent to those skilled in the art that many changes and modifications may be made without departing from the spirit and scope of the invention as defined in the appended claims.

What is claimed is:

1. A data encryption system for encrypting plaintext data of 8n bits, n being a positive integer, comprising:

an input unit for dividing the plaintext data into a first and a second half plaintext data block, each plaintext data block having 4n bits;

a key scheduling device for providing four n-bit constant values and N sets of round subkeys from an 8n-bit master key, N being a positive integer and each set of round subkeys having a first and a second 2n-bit round subkey and a first and a second n-bit round subkey;

N data encryption stages connected in series, each data encryption stage processing a first and a second 4n-bit input to provide a first and a second 4n-bit output, the first half and the second half plaintext data block being provided to a first data encryption stage as a first and a second 4n-bit input thereof, a second 4n-bit input of each data encryption stage being provided as a second 4n-bit output thereof, and a first and a second 4n-bit output of a data encryption stage being provided to its next data encryption stage as a second and a first 4n-bit input thereof, respectively; and an output unit for combining a first and a second 4n-bit output of a last data encryption stage to generate 8n-bit ciphertext data;

wherein an ith (i being 1 to N) data encryption stage includes an encrypter for encrypting a second 4n-bit input of the ith data encryption stage by using an ith set of round subkeys and the four n-bit constant values to provide an 4n-bit encrypted data block and an EX-OR gate for EX-ORing a first 4n-bit input thereof with the 4n-bit encrypted data block to provide a first 4n-bit output of the ith data encryption stage, and wherein the encrypter of the ith data encryption stage includes:

a first division unit for dividing the second 4n-bit input of the ith data encryption stage to provide a first and a second 2n-bit data subblock;

a first key adding circuit for EX-ORing the first and the second 2n-bit data subblock with a first and a second 2n-bit round subkey of an ith set of round subkeys to generate a first and a second 2n-bit added data subblock;

a second division unit for dividing the first 2n-bit key added data subblock into a first and a second n-bit key added data subblock and dividing the second 2n-bit key added data subblock into a third and a fourth n-bit key added data subblock;

a second key adding circuit having a first addition unit for performing an addition modulo 2n operation on the first and the third n-bit key added data subblock and a first multiplication unit for performing a multiplication modulo 2n+1 operation based on an output of the first addition unit and a first n-bit round subkey of the ith set of round subkeys to generate a first n-bit key/data added data subblock;

a third key adding circuit having a second addition unit for performing the addition modulo 2n operation on the second and the fourth n-bit key added data subblock and a second multiplication unit for performing the multiplication modulo 2n+1 operation based on an output of the second addition unit and a second n-bit round subkey of the ith set of round subkeys to provide a second n-bit key/data added data subblock; and means for processing the n-bit key added data subblocks and the n-bit key/data added data subblocks by using the four constant values to provide the 4n-bit encrypted data block.

2. The data encryption system of claim 1, wherein the processing means includes:

a data adding circuit for providing four n-bit EX-ORed data subblocks, wherein a first n-bit EX-ORed data subblock is obtained by EX-ORing the first n-bit key added data subblock and the second key/data added data subblock, a second n-bit EX-ORed data subblock is obtained by EX-ORing the second n-bit key added data subblock and the first n-bit key/data added data subblock, a third n-bit EX-ORed data subblock is obtained by EX-ORing the third n-bit key added data subblock and the second n-bit key/data added data subblock, and the fourth n-bit EX-ORed data subblock is obtained by EX-ORing the fourth n-bit key added data subblock and the first n-bit key/data added data subblock;

a substitution box for substituting the four n-bit EX-ORed data subblocks with four n-bit substituted data blocks;

a constant value adding circuit for respectively EX-ORing the four substituted data blocks with the four constant values to generate four n-bit EX-OR operated data blocks;

a linear transformer for providing four n-bit transformed data blocks by performing an addition modulo 2n operation on four different sets of three EX-OR operated data blocks; and a combining unit for combining the four n-bit transformed data blocks to generate the 4n-bit encrypted data block.

3. The data encryption system of claim 2, wherein n=16.

4. The data encryption system of claim 3, wherein N=16.

* * * * *